United States Patent [19]

Levy

[11] 4,044,353
[45] Aug. 23, 1977

[54] MICROWAVE LEVEL GAGING SYSTEM

[75] Inventor: Ralph Levy, Newton, Mass.

[73] Assignee: Simmonds Precision Products, Inc., Tarrytown, N.Y.

[21] Appl. No.: 712,168

[22] Filed: Aug. 6, 1976

[51] Int. Cl.² .............................................. G01S 9/38
[52] U.S. Cl. .................................... 343/12 R; 343/14
[58] Field of Search ................... 73/290 R; 343/12 R, 343/14

[56] References Cited

U.S. PATENT DOCUMENTS

| 2,147,810 | 2/1939 | Alford | 343/12 R |
| 3,226,714 | 12/1965 | Applegarth, Jr. | 343/12 R |
| 3,730,628 | 5/1973 | Wolcott et al. | 343/14 X |
| 3,921,169 | 11/1975 | Lazarchik et al. | 343/14 X |
| Re. 21,955 | 11/1941 | Chaffee | 343/14 |

Primary Examiner—Malcolm F. Hubler
Attorney, Agent, or Firm—Edwin E. Greigg

[57] ABSTRACT

A method and apparatus for measuring liquid level. A generated broad-band swept-frequency C.W. microwave signal (2-4 GHz) is upverted to a high frequency band signal (34-36 GHz), which is transmitted towards, and reflected from, a liquid surface. The reflected signal is downverted to the frequency band of the original generated signal, and then the phase difference between the original and downverted signals is measured by a microwave phase discriminator and a quantizer, which generates video pulses proportional to the total phase shift across the swept C.W. band. During an adjacent sweep in the same direction, the original signal is compared with a signal transmitted through a calibration cable equivalent to a known free-space path length. The unknown signal path to and from the liquid surface, can then be calculated by comparison of the video pulse train outputs during the CALIBRATE and OPERATE modes of operation, either by the ratio of the number of pulses, or the average time between pulses during each sweep.

Alternately, the mode of operation can be switched several hundred times during a single sweep across the bandwidth, and the unknown signal path corresponding to a particular liquid level can be calculated by comparison of the spacing during adjacent CALIBRATE and OPERATE modes to give several hundred measurements at different frequencies. Deviate measurements can then be eliminated, and the remaining measurements can be averaged to give a highly accurate true average measurement by known methods.

21 Claims, 3 Drawing Figures

MICROWAVE LEVEL GAGING SYSTEM

BACKGROUND OF THE INVENTION

The present invention relates to liquid level measuring methods and apparatus and particularly to methods and apparatus employing the use of transmitted and reflected microwave signals.

Prior to the present invention, one method of determining the level of a liquid in a tank using microwave signals was by measuring the time delay of a reflected microwave signal from the liquid surface in an coaxial delay line immersed in the liquid. The U.S. Pat. No. 3,853,005 to Robert E. Shendel, issued Dec. 10, 1974, and the references cited therein utilize this method.

In another known microwave liquid level measurement method, a multi-frequency continuous wave microwave signal is transmitted to a wave guide partially immersed in the liquid and the phase differences between the outgoing and reflected waves measured and used to determine the liquid level. However, in this and similar known methods, very accurate measurements and stabilization of the microwave frequencies are required.

OBJECTS AND SUMMARY OF THE INVENTION

Therefore, one object of this invention is to provide a method and apparatus for the continuous and accurate measurement of the level of a liquid surface, which does not require physical contact of the apparatus with, or immersion in, the liquid.

Another object of the invention is to provide a method and apparatus for continuous liquid level monitoring that uses a broad band swept-frequency continuous wave microwave signal whereby the liquid level is effectively measured at several hundred different frequencies, to minimize frequency-related measurement errors.

A further object of this invention is to incorporate calibration equipment, which can be used in conjunction with each measurement to eliminate the requirement of using known stable frequencies or bandwidth.

A still further object of this invention is to provide a method and apparatus for measuring the liquid level at several hundred frequencies during a single sweep of a broad-band-swept-frequency continuous wave microwave signal, with each measurement calibrated by comparison with a measurement of a known path length taken at a proximate time frequency to eliminate the need of knowing each measuring frequency, and with the liquid level being determined by a calculation of an average of those individual measurements which do not deviate more than a preselected percentage from the average of all the measurements thus further minimizing frequency-related measurement errors.

Yet another object of this invention is to disclose a completely digital method and apparatus of continually measuring the level of a liquid surface.

Still another object of this invention is to disclose a method and apparatus for measuring the level of a liquid surface using a broad-band, swept-frequency C.W. microwave signal, which is upconverted to a high microwave frequency band signal before transmitting the signal to the liquid surface and a portion of the signal reflected from the liquid surface is downverted to the original frequency band thereby reducing errors caused by sub-surface reflections in the liquid, while processing and measuring the microwave signals at the original low microwave frequency band using readily available, high quality apparatus.

OBJECT AND SUMMARY OF THE INVENTION

A broad-band swept-frequency continuous wave microwave signal is generated by a C.W. oscillator, which is swept by a sawtooth generator. This generated signal is transmitted downwards towards the top surface of the liquid being measured from a narrow beam transmitting antenna disposed above the liquid, and is reflected upward from the liquid surface to a similar narrow beam receiving antenna.

The reflected signal received is compared with the generated signal transmittal in a microwave phase discriminator which produces two voltage outputs, one proportional to the sine, and the other proportional to the cosine, of the phase difference angle between the transmittal and and received signals. Since the phase difference angle varies directly with the frequency and difference in path length, the change is the phase difference angle over the signal bandwidth will also be proportional with the difference in path length of the two signals.

The output signals of the phase discriminator is processed in a quantizer which generates a standard pulse, each time the sine and cosine outputs become zero. These pulses are counted for a complete sweep across the bandwidth. When, during an adjacent sweep across the bandwidth in the same direction, the transmitted signal is switched to pass through a calibrated cable of known equivalent free-space path length to the phase discriminator, and the pulse output of the quantizer again counted.

The length of the signal path between the transmitting and receiving antennas can then be calculated from the ratio of the number of pulses during the OPERATE mode, during which the generated signal is beamed at and reflected from the liquid surface, and the number of pulses during the CALIBRATE mode, during which the generated signal travels through the calibration cable.

Alternatively, the average time between pulses during the OPERATE and CALIBRATE modes of operation can be measured, and the length of the unknown path determined from the ratio of the average time between pulses during the two modes.

Also, the mode of operation can be switched several hundred times during a sweep across the bandwidth, and the length of the unknown path calculated by comparison of the pulse spacing during adjacent CALIBRATE and OPERATE modes to give several hundred measurements at different frequencies. Then, measurements that deviate from the overall average measurement more than a predetermined percentge can be disregarded, and a more accurate average calculated from the remaining measurements.

In a preferred embodiment, the transmitted signal can be upverted to a high microwave frequency band signal for transmission to, and reflection from, the liquid surface, then downverted to the original frequency band before comparison of the generated and received signals.

Also, the calibration cable can be built into the phase discriminator, or can be externally disposed between the transmitting and receiving antennas.

The invention will be better understood as well as further objects and advantages will become more apparent from the ensuing detailed specification taken in conjunction with the drawing.

BRIEF DESCRIPTION OF THE DRAWINGS

FIG. 1 is a block diagram of preferred embodiments of this invention, wherein the phase discriminator includes a calibration cable.

FIG. 2 is a schematic diagram of the phase discriminator with a built-in calibration cable, shown in FIG. 1.

FIG. 3 is a block diagram of another embodiment of this invention, using a standard phase discriminator and remote calibration path.

DESCRIPTION OF THE PREFERRED EMBODIMENTS

Figure 1:
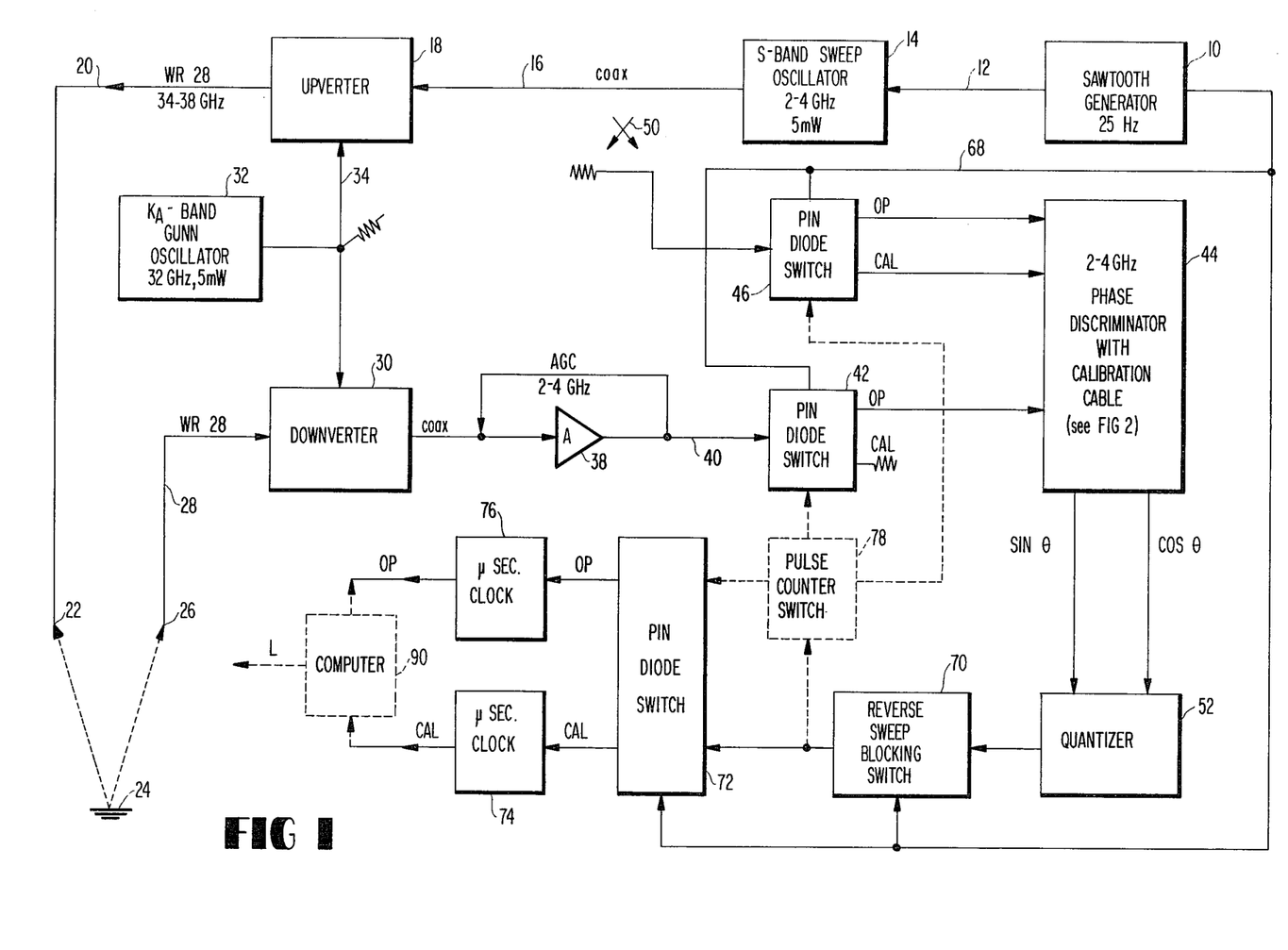

Referring now to FIG. 1, a 25 $H_z$ sawtooth sweep generator 10 is connected by line 12 to sweep a microwave continuous wave oscillator 14 over a rather broad frequency band of approximately 2 $GH_z$ bandwidth, from 2–4 $GH_z$.

The oscillator is connected by a coaxial line 16 to an upconverter 18, which upconverts the comparatively low microwave frequency band (2–4 $GH_z$) output signal of the oscillator 14 to a high microwave frequency band (34–36 $GH_z$) signal. This 34–36 $GH_z$ signal is transmitted by a suitable wave guide 20, such as WR 28 which has 0.28 × 0.14 inch internal dimensions, to a fixed narrow-beam antenna 22 disposed above the liquid surface 24 to be measured. This antenna 22 directs the transmitted signal towards the liquid surface 24 where it is reflected. A portion of the reflected signal is received by a similar narrow-beam antenna 26, also disposed above the liquid surface 24, which is well isolated from the transmitting antenna 22. This reflected signal is then transmitted by a suitable wave guide 28 to a downverter 30, which converts the received signal back to the original 2–4 $GH_z$ low microwave frequency band. The $K_a$-band Gunn oscillator 32 furnishes a 32 $GH_z$ modulating signal through the wave guide 34 to the upverter 18 and the downverter 30.

While not essential to the invention, this upverting-downverting technique offers several advantages: (1) being a superhet system, it has greater sensitivity, i.e. it may operate at lower transmitted power levels; (2) broad band low frequency solid-state microwave amplifiers are available, but such amplifers do not exist at very high frequencies; (3) the very high transmitted (carrier) frequency is more readily absorbed by the liquid in the tank, thus reducing errors caused by reflections from the bottom of the tank; and (4) the phase and calibration path measurements take place in a low frequency band where high quality components are more readily available at lower cost, and where the phase measurements are, in practice, more accurate.

The low frequency band output signal of the downconverter 30 is transmitted by a coaxial line 36 to an amplifier 38, whose amplified output signal is transmitted through a coaxial line 40 to a pin diode switch 42.

When the swtich 42 is switched into its operating mode, the received signal is transmitted to an input of a phase discriminator 44. Also, when the pin diode switch 46 is switched into its operating mode, the output signal of the oscillator 14 is supplied to the phase discriminator 44 through switch 46, coaxial line 48, and a coupling device 50, which is coupled to the output line 16 of the oscillator 14.

In the microwave phase discriminator 44, the phase of the received signal from switch 42 is compared with the phase of the transmitted signal from switch 46. The discriminator 44 generates two voltage outputs, one proportional to the sine, and the other propotional to the cosine, of the phase difference angle $\theta$ between the transmitted and received signal inputs. Assuming the circuit design is such that the difference in the path lengths of the two inputs to the discriminator 44 from the oscillator 14 is the length of path travelled between the transmitting and receiving antennas 22,26, the phase difference between the two discriminator input signals will vary directly as this path length L between the antennas 22,26 for any fixed frequency signal, i.e.

$$\theta = 2\pi fL/c \tag{1}$$

where $\theta$ is the phase difference in radians, $f$ is the frequency, L is the total path length from the transmitting antenna 22 to the receiving antenna 26, and $c$ is the velocity of light. If $f$ is in units of $MH_z$ and L in meters, we have $$\theta = 2\pi fL/299.79 \tag{2}$$

or $$L = 299.79 \,\theta/2\pi f \tag{3}$$

Now if $f$ is continuously swept of a bandwidth B from $f_1$ to $f_2$ $MH_z$, and $\theta$ varies from $\theta_1$ to $\theta_2$ radians, we have $$L = \frac{299.79\,(\theta_2 - \theta_1)}{2\pi B} \tag{4}$$

Thus, for a known bandwidth, the liquid level can be computed directly from the output signals of the phase discriminator 44. However, for some applications, such as on ocean tankers, severe noise problems could be encountered in transmitting the low frequency (0.3–10$KH_z$) discriminator output signals, so it is preferable to use some sort of quantizer transmitting microsecond pulses.

Referring again to FIG. 1, the phase discriminator outputs are processed in a quantizer 52 which generates a standarized one microsecond pulse every time $\theta$ changes by $\pi/2$, i.e., every time the sine and cosine outputs of the phase discriminator 44 become equal to zero. This will occur many times as the frequency is swept across the bandwidth B. Using these values in equation (4), we have $$L = (299.79/2B) \times (\pi N/2) \tag{5}$$

or $$L = (74.9475\,N/B) \tag{6}$$

where N is the number of pulses generated by the $\pi/2$ quantizer 52 during one sweep across the bandwidth B.

It is necessary to measure the bandwidth B very accurately, since from equation (6)

$$dL/dB = -L/B \tag{7}$$

Hence, for a bandwidth of 2000 $MH_z$, an error of 1 $MH_z$ in B would cause an error in L of L/2000, i.e. 0.5 mm per meter.

In order to eliminate the inherent difficulty of measuring the bandwidth B, the phase discriminator 44 itself it used, and in this sense, the system is self-calibrating.

Figure 2:
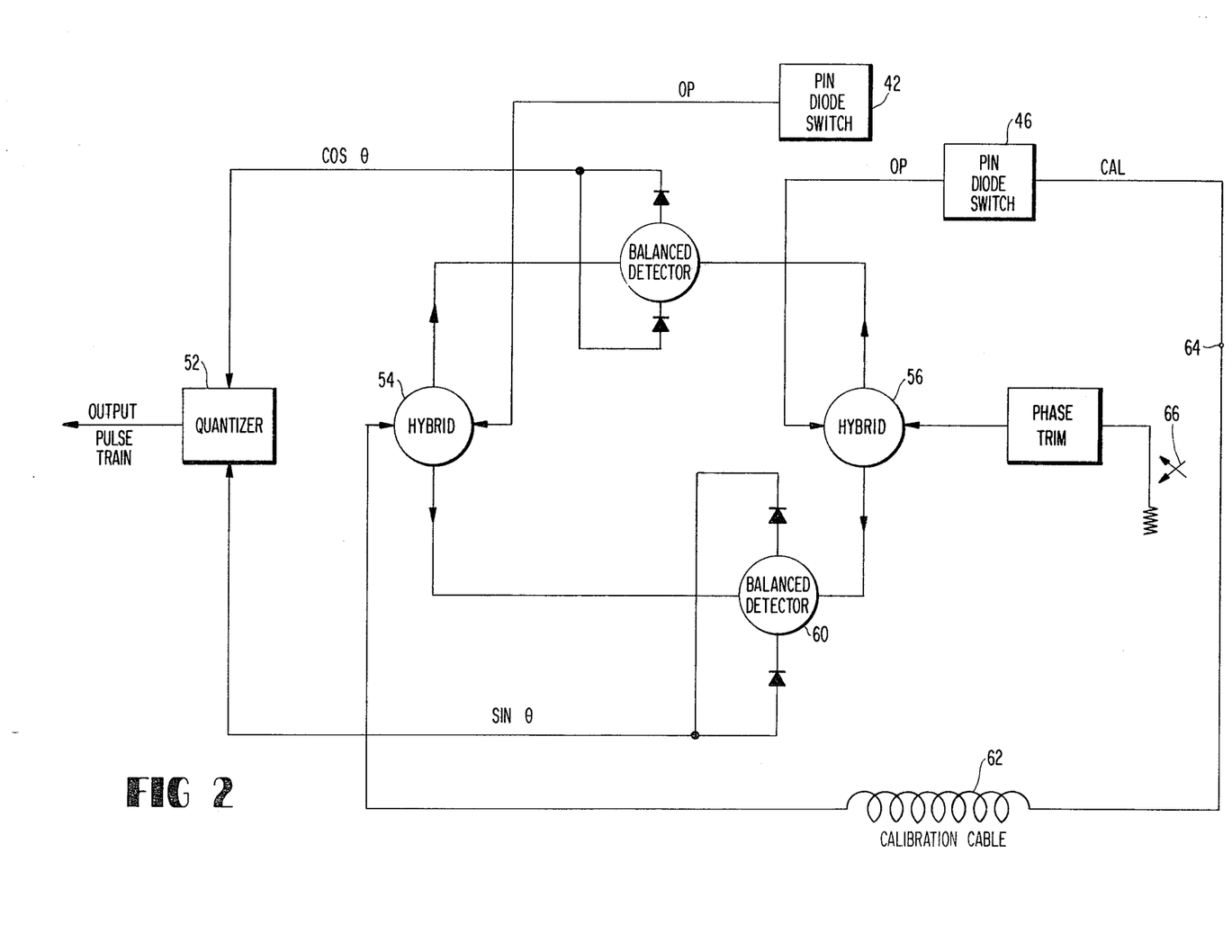

FIG. 2 shows two hybrids 54,56 and two balanced detectors 58,60 which comprise a standard commercially available phase discriminator as well as a calibration cable 62, and a directional coupler 66, which are added features. A first end of the calibration cable 62 is connected to a CAL input port 64 of the discriminator 44 and is coupled to an input of the hybrid 56 through the directional coupler 66. The opposite second end of the calibration cable 62 is connected to an input of the hybrid 54. In the calibrate (CAL) mode of operation, only the reference signal from the swept C.W. oscillator 14 is fed through the pin diode switch 46 to the CAL input port 64. The phase angle is now generated by the calibration cable 62, which is equivalent to a known free space path length $L_c$. Using this value of measured path length in equation (6)

$$L_c = 74.9475 \, N_c/B \tag{8}$$

or $$N_c = L_c B/74.9475 \tag{9}$$

where $N_c$ is the number of pulses generated in the quantizer 52 during one sweep across the frequency bandwidth B in the calibrate mode of operation. Thus, the bandwidth B for this sweep could be calculated from equation (9).

Also, from equation (6), it is seen that if the bandwidth remains constant, the number of pulses N will vary directly as the length of the path being measured, and for the same bandwidth $$N/N_c = L/L_c \tag{10}$$

or $$L = (N/N_c) \times L_c \tag{11}$$

While the bandwidth of the oscillator 14 can vary considerably, it will not change appreciably between adjacent sweeps. Therefore, if the discriminator 44 is operated in the CAL mode during a sweep in one direction across the frequency bandwidth, and then operated in the OP mode during the next sweep in the same direction, the bandwidth will be essentially the same for both sweeps, and the unknown path L can be calculated directly from equation (11) without the necessity of measuring the bandwidth.

Again referring to FIG. 1, the sawtooth generator 10 produces a signal transmitted through the synchronizing circuit 68 to actuate the reverse sweep blocking switch 70 connected to the output of the quantizer 52. This blocking switch 70 allows the pulse train output signal of the quantizer 52 to pass as the frequency is swept across the frequency band B by the sawtooth generator 10 in one direction, but blocks this signal as the frequency is swept in the opposite direction. The sawtooth generator 10 also operates pin diode switches 42,46 and 72 during each reverse sweep so that the apparatus is operated in the CAL mode during one sweep in the measuring direction, and in the OP mode in the next sweep in the same direction. The switch 72 receives the pulse signal passed by the blocking switch 70, and switches this pulse signal between a CAL and OP circuit to identify and differentiate the CAL and OP pulse outputs of the quantizer 52, thus enabling the unknown path length L to be calculated by known methods from equation (11).

From the foregoing description, it is apparent that the measuring accuracy is now dependent on the accuracy of counting a number of standardized pulses plus the error in the calibration cable, which is an improvement over prior practice that required very accurate measurements and stabilization of the microwave frequencies.

From equation (4), for a 2000 MH$_z$ bandwidth, the error in measuring L, due to the $\pi/2$ quantizing interval, will not exceed 75/2000 meters, or 3.75 cm, corresponding to one pulse in the pulse train output of the $\pi/2$ quantizer 52.

When L is calculated from equation (11), the maximum error due to the $\pi/2$ quantizing interval will be approximately 7.50 cm, corresponding to one less pulse in one pulse train, and one additional pulse in the other pulse train, if the two pulse trains corresponding to L and $L_c$. However, since any change in the liquid level 24 will only be half that of the measured path L, the error in measuring the liquid level will not exceed 3.75 cm.

One obvious way to reduce this measurement error due to the quantizing interval, is to increase the degree of quantization, as, for example, using a quantizer similar to that described in my British Pat. No. 1,014,036, in which the quantizing interval corresponds to a change in phase angle of $\pi/n$ radians, where $n$ is a selected integral power of four (4, 16, 64, etc.). Thus, for a $\pi/16$ quantizer, using the values in equation (4), we have $$L = (299.79/2 \, \pi B) \times (\pi N/16) \tag{12}$$

$$L = 9.375 \, N/B \tag{13}$$

Then the maximum in measuring the liquid level 24 due to the $\pi/16$ quantizing pulse interval for a bandwidth of 2GH$_z$ would be only 4.6875 mm.

Another and less costly way of reducing this measurement error, without increasing the degree of quantization from $\pi/2$, is to use the average time between pulses rather than the number of pulses per sweep to calculate the path length. In the CAL sweep, the position of each output pulse from the quantizer is recorded in time by using a one-microsecond clock 74, from which an average interval between pulses $t_c$ can be calculated by known methods from the total time interval $T_c$ between the first and last pulse $$t_c = T_c/(N_c - 1) \tag{14}$$

In the OP sweep, the same process is carried out, i.e. each quantizer pulse is recorded in time by a one-microsecond clock 76, and the average pulse interval $t_o$ calculated. The length L of the exterior path being measured will be $$L = (t_c/t_o) \times L_c \tag{15}$$

In effect, this method eliminates the measurement error due to the degree of quantization. The possible measurement error, using this method, due to the degree of accuracy to which the time between the first and last pulses in the CAL and OP sweeps are measured, is very small. For example, assuming these time values can be measured to within one microsecond, in a 40 millisecond sweep, the maximum error would be 2/40,000 meters per meter, or 0.05 mm per meter. However, this relatively simple technique of measuring average pulse intervals is susceptible to significant errors if the number of pulses recorded is incorrect, e.g. one pulse fails to record, or an "extra" noise pulse is picked up. To minimize these possibilities, the external path and the calibrated path can be measured and recorded several hundred times during the sweep and the length of the external path calculated for each OP measurement using the formula $$L = \frac{\text{pulse spacing in CAL mode at time t}}{\text{pulse spacing in OP mode at time t}} \times L_c \qquad (16)$$

where the time $t$ can be defined as any time close to the occurrence of the CAL and OP pulses in question, since the nonlinearities are expected to vary quite slowly during the sweep period.

Next an average of all the values for the external path length measured during the sweep can be calculated. Then, all path length values which deviate from the average by more than a predetermined fraction, say 5%, can be eliminated and a new, highly accurate average can be calculated from the remaining values.

FIG. 1 illustrates one embodiment of this method. At the beginning of a sweep circuit in one direction, the sawtooth generator 10, as previously described, generates a synchronizing signal to switch the pin diode switches 42,46 and 72 into the CAL mode. At least two pulse outputs of the quantizer 52 are necessary for the clock 74 to record the CAL pulse spacing. After the second pulse, the pulse counter switch 78 (shown in dashed lines) generates a signal to switch the mode switches 42,46 and 72 to the OP position to allow the clock 76 to record the OP pulse spacing between the next two pulse outputs, so the a value for the external path length can be calculated and stored by known methods. The pulse counter switch 78 continues to switch the mode switches 42,46 and 72 between their OP and CAL positions as the signal from the oscillator 14 is swept across the bandwidth B. At the end of the sweep, calculations are performed by known methods, using the path length values calculated and stored during the sweep, to eliminate deviate values and to calculate a more accurate average from the remaining values.

The measurement error, due to the accuracy to which each pulse interval can be measured, is minimized by averaging several hundred individual measurements. Also, the accuracy and reliability is improved in the physical sense, by measuring the path length at many different frequencies over a bandwidth of 2000 $MH_z$.

When the calibration cable 62 is coupled to the inputs to the phase discriminator 44 as shown in FIGS. 1 and 2, a possible measurement error can be introduced by imperfections in the microwave components used, such as dispersive phase shifts in the switches 42,46. One method of minimizing this source of measurement error is to provide switches for a calibration path immediately before the transmitting and receiving antennas 22,26 as shown in FIG. 3.

Figure 3:
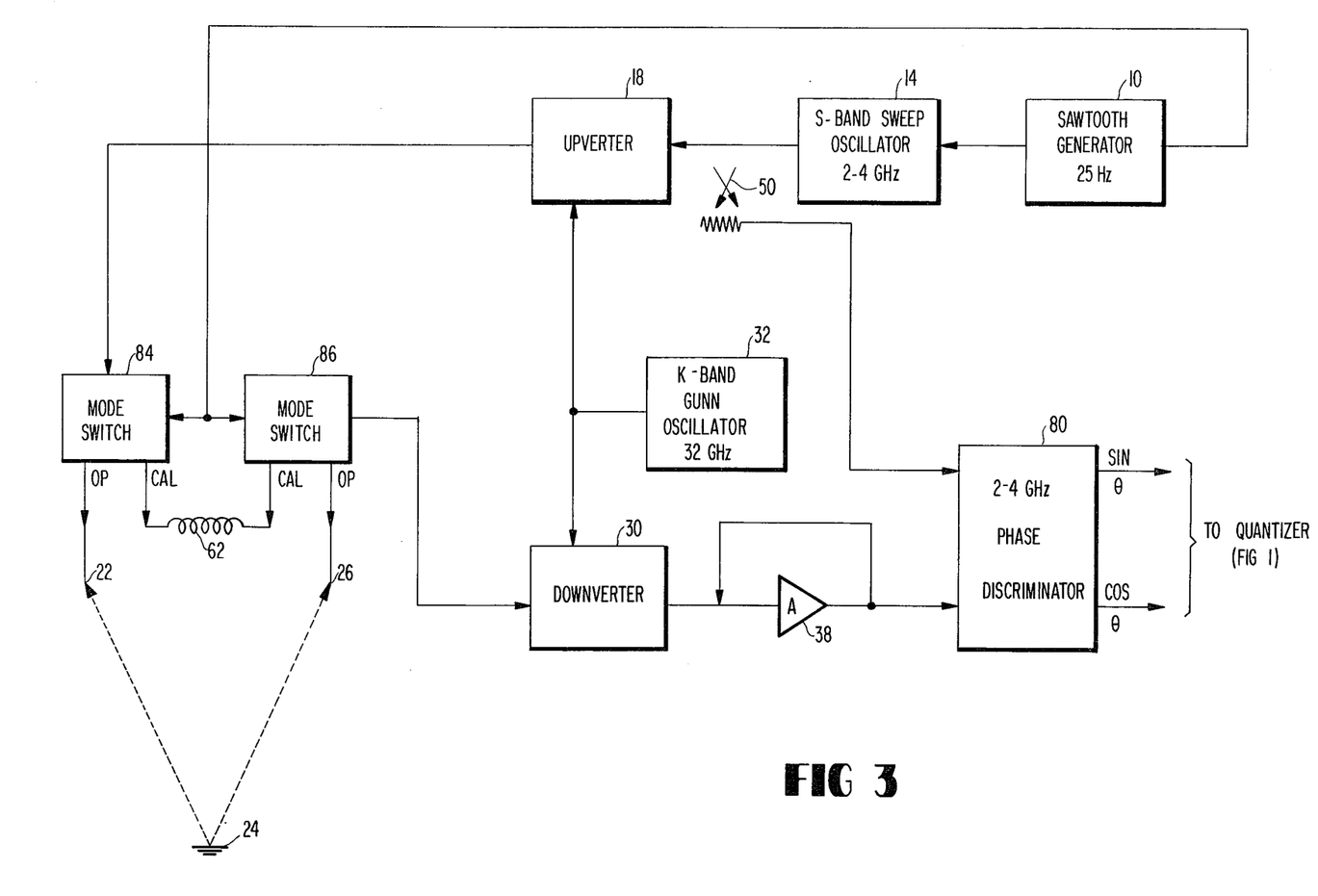

In FIG. 3, a standard, commercially available phase discriminator 80 is used instead of the phase discriminator 44 with a built-in calibration cable. The transmitted output signal of the oscillator 14 is continuously supplied to one hybrid input of the phase discriminator 80 from the coupling device 50, and the received signal is supplied to the other hybrid input of the discriminator, either from the receiving antenna 26 or through the calibration path 62.

Switches 84,86 disposed ahead of the transmitting abd receiving antennas 22,26 perform the same function and receiving antennas 22,26 perform the same function as the pin diode switches 42,44 of FIG. 1 of switching between the calibrated path 62 and path L to be measured, and are similarly activated by the synchronizing signals generated by the sawtooth generator 10 or the pulse counter switch 78.

In the circuit of FIG. 3, the received microwave signal is processed by the same electronic components, for both the OP and CAL modes. However, such a calibration path between the two antennas 22,26 is more costly and difficult to provide than is the built-in calibration cable 62.

Since the exact locations of the transmitting and receiving antennas are known, any path length L of the signal transmitted and received by these antennas, calculated by any of the methods disclosed herein, will correspond to a particular level of the liquid being measured, relative to these antennas.

Any known means can be used to record, compare, and calculate the path length L or the corresponding liquid level from the output signals produced during the CALIBRATE and OPERATE modes by the calculating methods described herein. For example, these output signals can be supplied to, and stored in, a computer 90 shown in dashed lines on FIG. 1, and the path length L can be calculated by this computer by any of the methods described. However, these means are not limited to computers or the like, since many of these calculating methods could be performed manually rather than by calculating apparatus, or by a combination of manual and machine computations

What is claimed is:

1. A liquid level measurement apparatus which comprises:
   means for generating a broad-band, swept frequency continuous wave, microwave signal, which includes
   a microwave, continuous wave, sweep oscillator, and
   a sawtooth generator that frequency-modulates said oscillator with a linear sawtooth waveform;
   means for transmitting said oscillator broad-band signal in a narrow beam onto a liquid surface being measured, which includes a narrow-beam transmitting antenna;
   means for receiving a portion of said oscillator broad-band signal reflected from said liquid surface, which includes a narrow-beam receiving antenna;
   a microwave phase discriminator, having two inputs and two outputs, for detecting the phase difference between first and second microwave input signals, and which produces a first output signal proportional to the sine of the phase angle between said first and second input signals, and a second output signal proportional to the cosine of said phase angle;
   a quantizer, connected to said phase discriminator outputs, for producing a standarized microsecond output pulse at each of a plurality of equally spaced, predetermined phase angles between said phase discriminator output signals, as said phase angle changes;
   blocking means, connected to an output of said quantizer, for passing said quantizer output pulses as the frequency of the oscillator broad-band output signal is swept across the bandwidth in one direction selected as the measuring sweep direction, and for blocking said quantizer output pulses as the frequency of the oscillator signal is swept across the bandwidth in the opposite direction;

a calibrated microwave conductor, equivalent to a known free-space path length, which has an input end and an output end;

means, which include electrically-operated discriminator input switches, for connecting said apparatus to operate in either a CALIBRATE or an OPERATE mode, whereby said transmitting means is coupled to said first input of said phase discriminator, and said transmitting means is coupled to said second input of said phase discriminator through said calibrated conductor to operate said apparatus in said CALIBRATE mode, and said transmitting means is coupled to said first input of said phase discriminator, and said receiving means is coupled to said second input of said phase discriminator to operate said apparatus in said OPERATE mode;

control means for said discriminator input switches, for operating said apparatus in said CALIBRATE mode for a first predetermined interval of said oscillator signal, and in said OPERATE mode for a second predetermined interval of said oscillator signal, said first and second intervals being equal and adjacent to each other during sweeps across the frequency bandwidth in the measuring direction;

means, connected to said blocking means, to identify and differentiate said quantizer output pulses produced during said CALIBRATE mode of operation from said pulses produced during said OPERATE mode, and means for comparing said CALIBRATE and OPERATE quantizer output pulses, and calculating the path length of the reflected signal, corresponding to a particular liquid level, from said comparison.

2. A liquid level measuring apparatus, as defined in claim 1, which further comprises:

an upverter, disposed in said transmitting means ahead of said transmitting antenna, for converting a low microwave frequency band output signal of said oscillator to a high microwave frequency band signal for transmission by said transmitting antenna;

a downverter, disposed in said receiving means, for converting the reflected high microwave frequency band signal received by said receiving antenna to the original low microwave frequency band of said oscillator signal, and a Gunn oscillator, coupled to said upverter and downverter, to supply high microwave frequency synchronized modulating and demodulating signals to same.

3. A liquid level measuring apparatus, as defined in claim 1, which further comprises an amplifier disposed in said receiving means, for amplifying said reflected signal received by said receiving antenna.

4. A liquid level measurement apparatus, as defined in claim 1, wherein said means for connecting said apparatus to operate in a CALIBRATE of an OPERATE mode comprises:

a first directional coupling device, coupled to said transmitting means to receive said oscillator output signal;

a first switch of said discriminator input switches, which has an input connected to said first directional coupling device, a CALIBRATE output connected to said input end of said calibrated conductor, and an OPERATE outlet connected to said first input of said phase discriminator, said first switch input being connected to said CALIBRATE or OPERATE output for the corresponding CALIBRATE or OPERATE mode of operation;

means for connecting said output end of said calibrated conductor to said second input of said phase discriminator;

a second directional coupling device, coupled to said input end of said calibrated conductor and connected to said first input of said phase discriminator, for supplying said oscillator output signal to said phase discriminator during the CALIBRATE mode of operation; and a second switch of said discriminator input switches, which has an input connected to said receiving means, and an OPERATE output connected to said second input of said phase discriminator, said second switch input being connected to said OPERATE output during the OPERATE mode, and being disconnected from same during the CALIBRATE mode of operation.

5. A liquid level measurement apparatus, as defined in claim 1, wherein said means for connecting said apparatus to operate in a CALIBRATE or an OPERATE mode comprises:

a first directional coupling device, coupled to said transmitting means to receive said oscillator output signal, and connected to said first input of said phase discriminator;

means for connecting said second input of said phase discriminator to said receiving means;

a first switch of said discriminator input switches, disposed in said transmitting means in close proximity to said transmitting antenna, and having an input connected to said transmitting means to receive said transmitted signal, an OPERATE output connected to said transmitting antenna, and a CALIBRATE output connected to said input end of said calibrated conductor, said first switch input being connected to said OPERATE or CALIBRATE output for the corresponding OPERATE or CALIBRATE mode of operation; and a second switch of said discriminator input switches, disposed in said receiving means in close proximity to said receiving antenna, which has an OPERATE output connected to said receiving antenna, a CALIBRATE input connected to said output end of said calibrated conductor, and an output connected through said receiving means to said second input of said phase discriminator, said second switch output being connected to aid OPERATE or CALIBRATE inputs for the corresponding OPERATE or CALIBRATE mode of operation.

6. A liquid level measurement apparatus, as defined in claim 1, wherein said control means for said discriminator input switches comprises said sawtooth generator, coupled to said discriminator input switches to electrically operate said input switches upon completion of said measuring sweep, whereby said apparatus operates in the CALIBRATE mode for one measuring sweep, and in the OPERATE mode for an adjacent measuring sweep.

7. A liquid level measurement apparatus, as defined in claim 1, which further comprises timing means, which are connected to said means for identifying the mode of said quantizer output pulses, for recording time intervals between pulse outputs.

8. A liquid level measurement apparatus, as defined in claim 7, wherein said control means for said discriminator input switches comprises a pulse counter switching means for switching said discriminator input switches after every two pulse outputs of said quantizer.

9. A liquid level measurement apparatus, as defined in claim 1, wherein each interval between said output pulses of said quantizer corresponds to a change in said phase angle of $\pi/2$ radians.

10. A liquid level measurement apparatus, as defined in claim 1, wherein each interval between said output pulses of said quantizer corresponds to a change in said phase angle of $\pi/n$ radians, where $n$ is a selected integral power of four.

11. A liquid level measuring method, which comprises the steps of:
generating a broad-band, swept-frequency, continuous wave, microwave signal;
transmitting said microwave signal in a narrow beam onto a liquid surface being measured;
receiving a portion of said microwave signal reflected from said liquid surface;
comparing said reflected signal with a portion of said generated signal during a first predetermined interval while said generated signal is being swept across the frequency band in a measuring direction, and generating a first phase angle signal proportional to the phase angle between said generated and said reflected signal;
quantizing said first phase angle signal to produce a standard pulse output at each of a plurality of equally spaced predetermined phase angles, said pulses comprising a first pulse train proportional to the change in said phase angle during said first predetermined interval;
transmitting at least a portion of said generated microwave signal through a calibration conductor having a length equivalent to a known free-space path length $L_c$;
comparing said signal passed through said calibration conductor with a portion of said generated microwave signal during a second predetermined interval that is equal and adjacent to said first predetermined interval while said generated microwave signal is being swept across the frequency band in said measuring direction, and generating a second phase angle signal proportional to the phase angle between said generated microwave signal and said signal from said calibration conductor;
quantizing said second phase angle signal to produce said standard pulse outputs at each of said plurality of equally spaced phase angles, said pulses comprising a second pulse train proportional to the change in phase angle during said second predetermined interval;
comparing said first and second pulse trains; and calculating the path length L of the reflected signal, corresponding to a particular level of the liquid, from said comparison of the first and second pulse trains, and the known freespace path length $L_c$ of said calibration conductor.

12. A liquid level measuring method, as described in claim 11, which further comprises the steps of:
upverting said generated microwave signal from a relatively low frequency microwave band signal to a high microwave band signal before said step of transmitting said microwave signal onto said liquid surface; and
downverting said reflected microwave signal to the frequency band of said generated microwave signal after said reflected signal is received.

13. A liquid level measuring method, as described in claim 12, which further comprises the step of amplifying said downverted signal.

14. A liquid level measuring method, as described in claim 11, wherein each of said first and second predetermined intervals comprises one complete sweep across the frequency band of said generated microwave signal in the measuring direction.

15. A liquid level measuring method as described in claim 14, wherein:
the step of comparing said first and second pulse trains is the step of comparing the number of pulses N of said first pulse train and the number of pulses $N_c$ of said second pulse train; and
the step of calculating the path length L of said reflected signal is performed using an equation $$L = (N/N_c) \times L_c$$

16. A liquid level measuring method as described in claim 14, which further comprises the steps of:
measuring and recording the time intervals between said standard pulses; and
calculating an average time interval between pulses $t_o$ for said first pulse train and an average time interval between pulses $t_c$ for said second pulse train; wherein
the step of comparing said first and second pulse trains is the step of comparing the average time interval between pulses $t_o$ of the first pulse train and the average time interval between pulses $t_c$ of the second pulse train; and
the step of calculating the path length L of said reflected signal is performed using the equation:

$$L = (t_c/t_o) \times L_c$$

17. A liquid level measuring method, as described in claim 11, wherein each of said first and second predetermined intervals comprises a portion of a single sweep across the frequency band of said generated microwave signal in the measuring direction, during which portion two standard pulses are produced.

18. A liquid level measuring method, as described in claim 17, which further comprises the steps of:
measuring and recording the pulse interval, or the time interval between said two standard pulses, of said first and second pulse trains; wherein
the step of comparing said first and second pulse trains is the step of comparing the pulse interval of the first pulse train with the pulse interval of the second pulse train; and
the step of calculating the path length L of said reflected signal is performed using the equation:

$$L = \frac{\text{pulse interval of the second pulse train}}{\text{pulse interval of the first pulse train}} \times L_c$$

19. A liquid level measuring method as described in claim 18 which further comprises the steps of:
calculating and recording a first quantity of values for the path length L of said reflected signal from measuring and recording pulse intervals for an equal quantity of said first and second pulse trains during a single sweep across the frequency band of said generated microwave signal in the measuring direction;

calculating a first average value of the path length L of the reflected signal from said first quantity of recorded values for the path length L;

eliminating from said first quantity of recorded values for the path length L, all values for L which deviate more than a predetermined percentage from said first average value of the path length L, to obtain a second quantity of recorded values for the path length L; and calculating a second average value of the path length L of the reflected signal from said second quantity of recorded values for the path length L.

20. A liquid level measuring method, as defined in claim 11, wherein said equally spaced phase angles at which said standard pulses are produced are equally spaced at intervals corresponding to $\pi/2$ radians of said first and second phase angle signals being quantized.

21. A liquid level measuring method as defined in claim 11, wherein said equally spaced phase angles at which said standard pulses are produced are equally spaced at intervals corresponding to $\pi/n$ radians of said first and second phase angle signals being quantized, where $n$ is a selected integral power of four.

* * * * *